United States Patent
Schmied et al.

(10) Patent No.: US 7,302,865 B2
(45) Date of Patent: Dec. 4, 2007

(54) SENSOR MAT

(75) Inventors: Martin Schmied, Neckarweihingen (DE); Ralf Henne, Sachsenheim (DE); Dietmar Jungen, Mehren (DE); Andreas Steier, Pellingen (DE); Björn Wittmann, Aach (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 11/165,634

(22) Filed: Jun. 23, 2005

(65) Prior Publication Data

US 2006/0137481 A1 Jun. 29, 2006

(30) Foreign Application Priority Data

Dec. 23, 2004 (DE) .............. 20 2004 019 805 U

(51) Int. Cl.
  *B60R 21/05* (2006.01)
  *G01L 5/22* (2006.01)
(52) U.S. Cl. .............. 73/862.041; 73/865.9; 280/735
(58) Field of Classification Search .. 297/217.2–217.3; 73/862.041, 865.9; 280/735
See application file for complete search history.

(56) References Cited

U.S. PATENT DOCUMENTS

| 5,086,652 | A | * | 2/1992 | Kropp | ............... 73/862.041 X |
|---|---|---|---|---|---|
| 5,975,568 | A | | 11/1999 | Speckhart et al. | .......... 280/735 |
| 6,345,839 | B1 | * | 2/2002 | Kuboki et al. | ............... 280/735 |
| 7,132,953 | B2 | * | 11/2006 | Young et al. | ....... 73/862.041 X |
| 2002/0027348 | A1 | * | 3/2002 | Speckhart et al. | .......... 280/735 |
| 2003/0189362 | A1 | * | 10/2003 | Lichtinger et al. | ........ 297/217.3 |
| 2004/0174004 | A1 | | 9/2004 | Smith et al. | ................. 280/735 |
| 2006/0087164 | A1 | * | 4/2006 | Young et al. | ............. 297/217.2 |
| 2006/0091708 | A1 | * | 5/2006 | Zenba e al. | ............... 297/217.3 |

FOREIGN PATENT DOCUMENTS

| DE | 196 01 969 | 7/1997 |
| DE | 196 46 480 | 5/1998 |
| DE | 198 80 187 | 4/1999 |
| DE | 199 63 146 | 7/2001 |
| DE | 103 14 472 | 10/2003 |
| DE | 102 49 871 | 5/2004 |
| JP | 63261186 A | * 10/1988 ................. 73/865.9 |
| WO | 00/00370 | 1/2000 |

* cited by examiner

*Primary Examiner*—Thomas P. Noland
(74) *Attorney, Agent, or Firm*—Kenyon & Kenyon LLP

(57) ABSTRACT

A sensor mat, particularly for vehicle seats in connection with restraint systems, which includes at least one positioning strip that may be snapped onto a fastener.

4 Claims, 4 Drawing Sheets

SENSOR MAT

FIELD OF THE INVENTION

The present invention relates to a sensor mat, especially for passenger classification and/or passenger detection in connection with restraint systems.

BACKGROUND INFORMATION

Systems for passenger classification are used in the automotive field. These systems are based, among other things, on sensor mats that are connected with an evaluation electronics system, and that are built into the vehicle seat cushion. They supply an output signal that corresponds to the weight of the person on the seat, which is evaluated for the weight-dependent control of the restraint systems by the air bag control unit. When the seat is unoccupied, the triggering of the means of restraint is forestalled.

At this time, there are various methods to fix this sensor mat, when installing it in the seat cushion, in a setpoint position in such a way that it cannot slip out of place during the fixing on of the seat cover. This is important, since a sensor mat that has slipped out of place may lead to a wrong classification or to the triggering of means of restraint in the case of an unoccupied seat cushion.

Examples of fixing the sensor mat are described in German Patent Application No. DE 103 14 472. Thus, a sensor mat is fixed to the seat cushion foam by being adhered to it, using a double adhesive tape or adhesive strip, by being stuck to the seat cushion foam, using pins, such as fir cone pins, or by being fixed to the seat cushion foam by Velcro.

SUMMARY OF THE INVENTION

According to the present invention, the fixing aid positions a sensor mat, for example, for passenger classification and/or for passenger detection or other functional mats, reliably in a setpoint position, without the use of additional component parts, such as adhesive tape, pins, fir cone pins, etc.

Slipping out of place of the sensor mat/functional mat during the construction of the seat cushion is effectively avoided.

The fixing aid is achieved by the suitable geometrical design of the sensor mat and the devices already present in the seat cushion for fixing on the seat cover (such as wing clips). This clearly reduces the expenditure and, at the same time, gains in reliability, since slipping out of place becomes almost impossible. The appropriately designed sensor mat is snapped into the present device for fixing on the seat cover (e.g. wing clips) and is thereby positioned into the setpoint position.

In this context, the fixing is particularly precise, since the devices for fixing on the seat cover are fitted very accurately into the seat foam.

Owing to the fixing aid according to the present invention, no additional component parts such as adhesive tape, pins, fir cone pins, etc., are required for fixing. In contrast to an adhesive connection, the fixing created is detachable without damage to the sensor mat. This is particularly important in case of repairs.

DETAILED DESCRIPTION

On the sensor mat there are provided positioning strips having suitable openings for snapping into place into the devices for fixing on the cover (e.g. wing clips). The openings in the positioning strips are formed in such a way that a secure snapping in is ensured, e.g. using the wing clips. The positioning strips are connected to the mat in such a way that the sensor mat is positioned in the setpoint position by snapping into, for instance, the wing clips.

Figure 1:
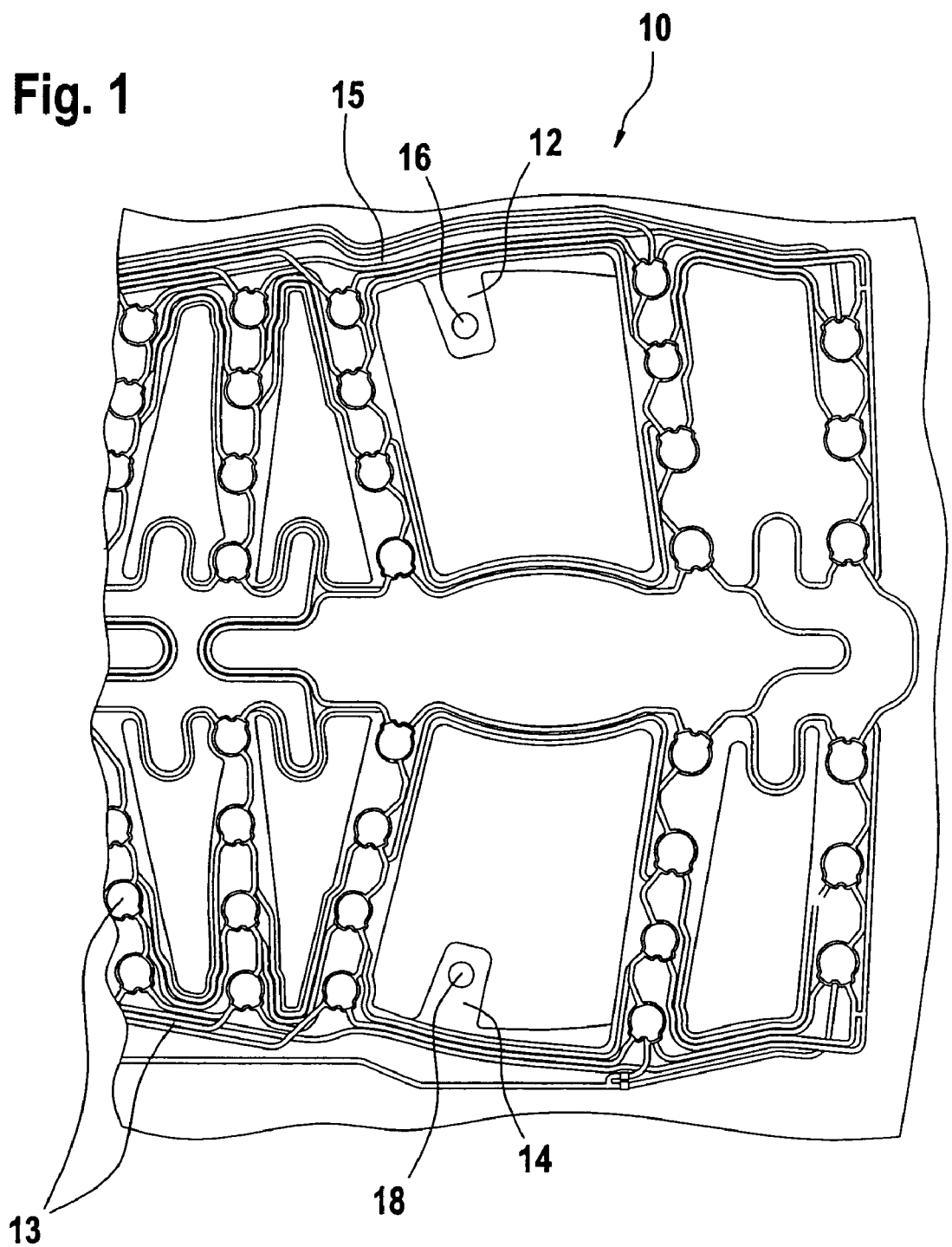
FIG. 1 shows an image of a sensor mat.

FIG. 1 shows a sensor mat 10 which, in the embodiment shown, has two positioning strips 12 and 14. The positioning strips are a part of sensor map 10, in this instance. The positioning strips are stamped during the manufacturing of the sensor mat, which is also stamped, of the base material for the sensor mat, together with carrier structure 15 for the electrical parts. Electrical structures 13 are then printed onto the carrier structure of the sensor mat. Consequently, fitting measures, such as adhesion, etc., are not necessary. The positioning strips have openings 16, 18 that are formed in such a way that they snap into the fastening means in the assembly. In one embodiment, the fastening means are wing clips, so that the openings are circular, having dimensions that correspond to the wing clips. What is important is that the positioning strip snaps in with the assigned fastening means, so that detaching the strips is only possible with the application of considerable force, and coincidental detachment of the strips during normal operation of the seat is prevented.

Figure 2:
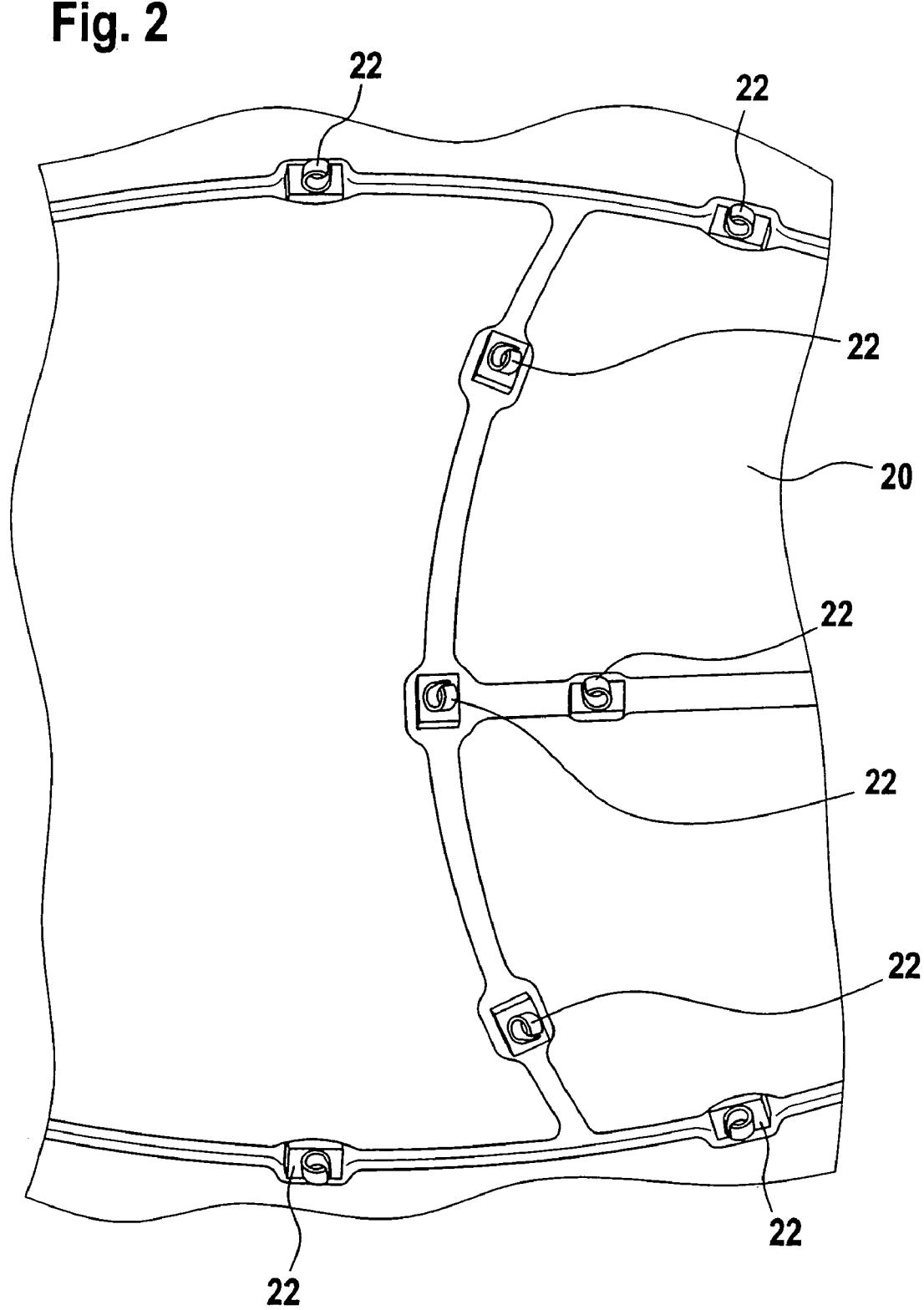
FIG. 2 shows the seat foam of a vehicle seat having fastening means for the seat cover, which are also used for fastening the sensor mat.

FIG. 2 shows seat foam 20 of a vehicle seat having fastening means 22 for the seat cover. Fastening means 22 are wing clips, in this instance, by which the seat cover is fastened tightly (braced). They are also used for fixing and positioning the sensor mat.

Figure 3:
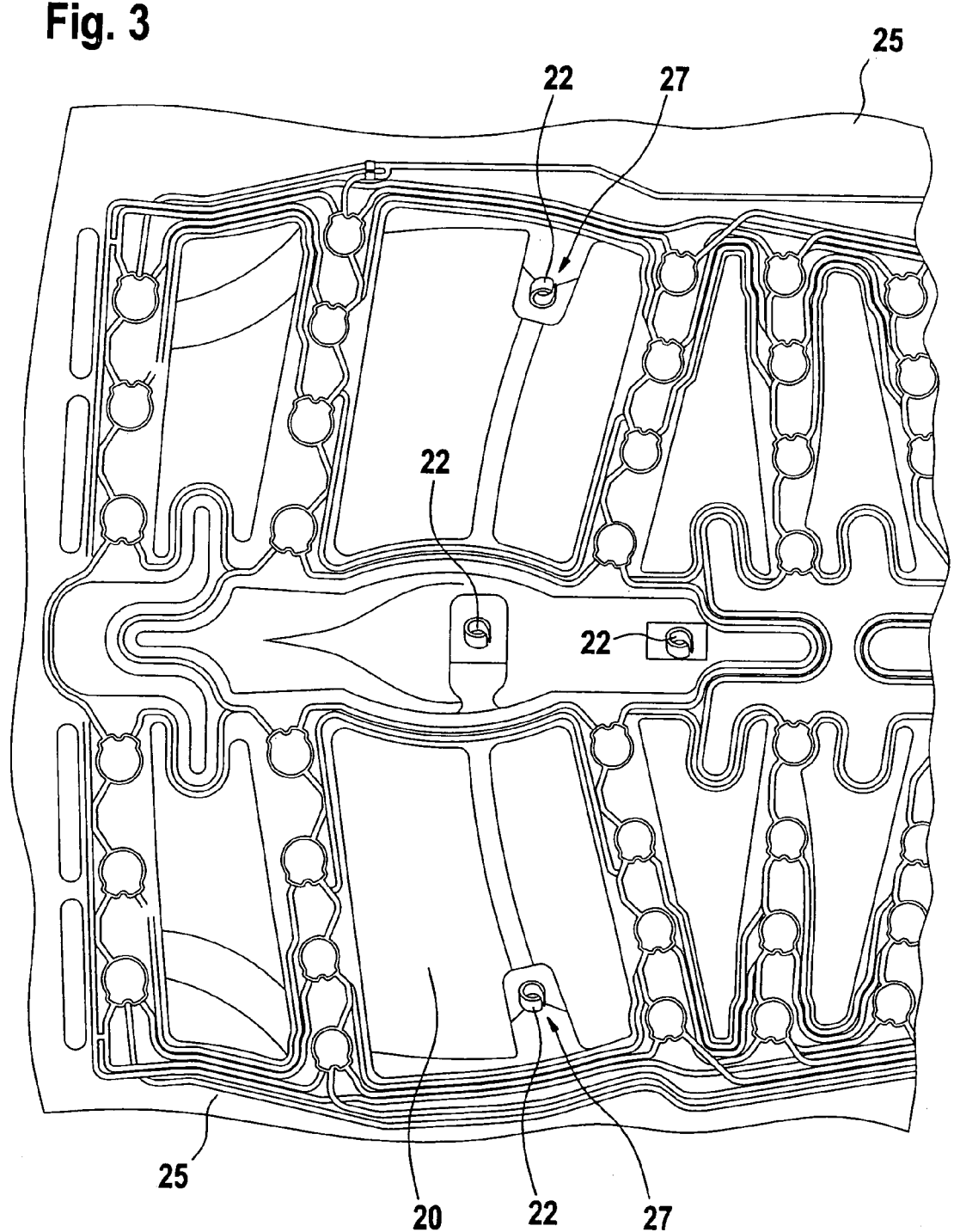
FIG. 3 represents the fixing of the sensor mat to this seat foam.

This is depicted in FIG. 3. There, seat foam 20, that is known from FIG. 2, is shown with fastening means 22. Furthermore, a sensor mat 25, having positioning strips 27, has been laid onto the seat foam. Positioning strips 27 are snapped into fastening means 22. This fixes sensor mat 25 in its setpoint position. In this context, not all available fastening means are used, but only as many as are necessary to fix the sensor mat. In one exemplary embodiment, three positioning strips are provided, which are plugged into three available fastening means.

Figure 4:
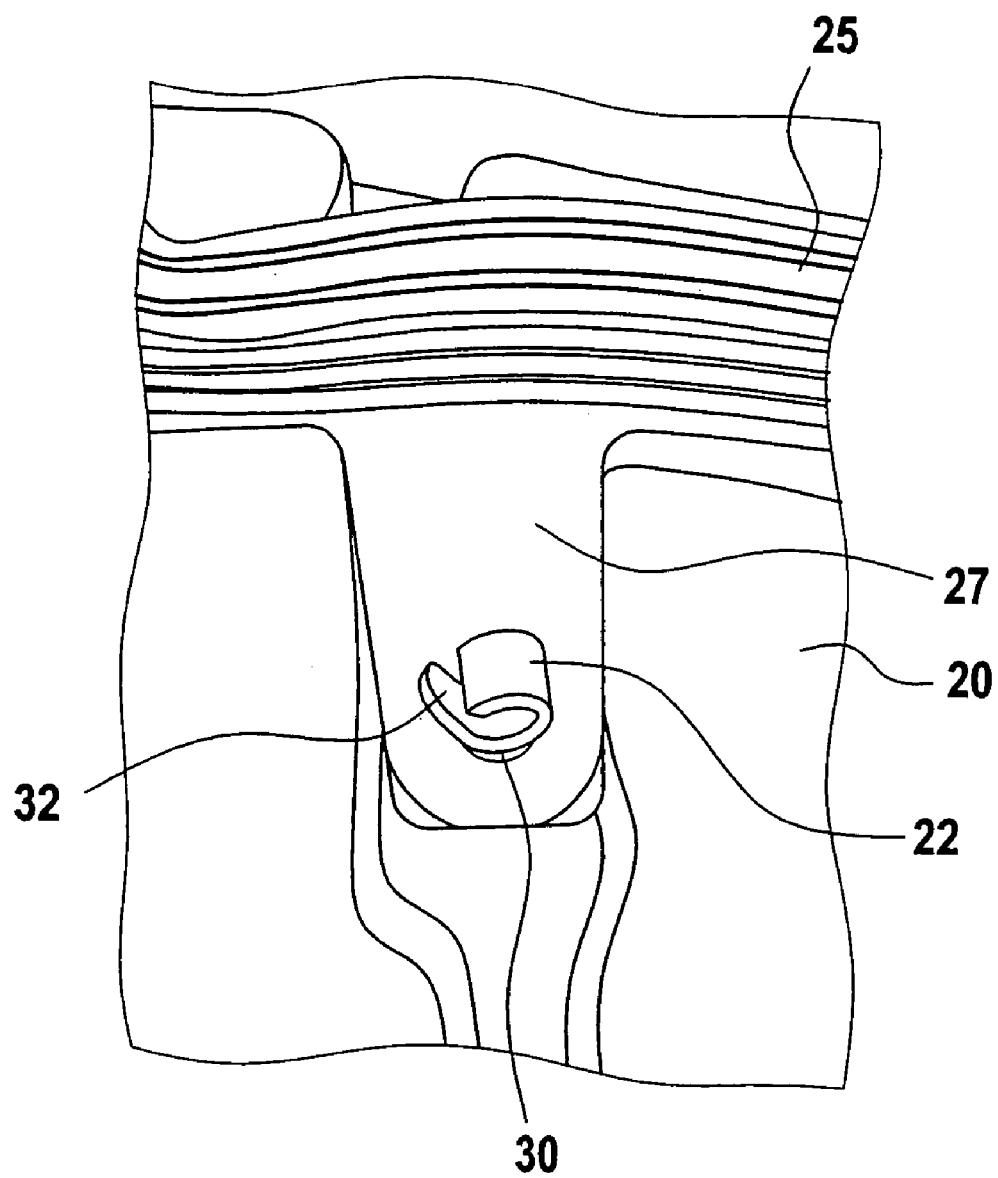
FIG. 4 shows the fixing of a positioning strip of the sensor mat in a wing clip.

FIG. 4 shows a cutout of FIG. 3, in which one positioning strip is shown snapped into a wing clip. FIG. 4 shows seat foam 20, sensor mat 25, positioning strip 27 of sensor mat 25 as well as wing clip 22. The positioning strip is formed from the base carrier of sensor mat 25. Opening 30 of positioning strip 27 is formed in such a way that it is adapted to the dimensions of the wing clip. The wing clip is pressed through this opening in the positioning strip, and the sensor mat is snapped in this manner into its setpoint position. This is achieved in that the wing clip has at least one movable tab which, in the manner of a barb, prevents the positioning strip from detaching itself again in an independent manner. The opening in the positioning strip is essentially circular, and in this context, the circular diameter is slightly smaller than the dimensions of the fastening means when at rest, in order to avoid detachment in an independent manner; it is, however, big enough so that the flexibility of the material of the sensor mat and/or of the fastening means permits a snapping on of the positioning strip, using a slight force effort.

The positioning strip, in this context, is also formed in such a way that it fits into a recess in the seat foam. Furthermore, the positioning strip may be detached again by an appropriate force effort or by pressing the wing clip, without damaging the sensor mat.

What is claimed is:

1. A sensor mat for a seat of a vehicle for cooperating with a restraint device of the vehicle, the vehicle seat including a fastening device, the sensor mat comprising:

at least one positioning strip adapted to be snapped into the fastening device;

wherein the positioning strip is adapted to be snapped into the fastening device that is situated on the vehicle seat for fixing on a seat cover.

2. The sensor mat according to claim 1, further comprising a base carrier, and wherein the positioning strip is formed from the base carrier.

3. The sensor mat according to claim 1, wherein the positioning strip is adapted to be snapped together with the fastening device in a detachable manner.

4. The sensor mat according to claim 1, wherein the positioning strip has an opening into which the fastening device is plugged, a dimension of the opening being adapted to the fastening device in such a way that a detaching is possible only using a force effort.

* * * * *